Patented May 16, 1939

2,158,864

UNITED STATES PATENT OFFICE 2,158,864

METAL COMPOSITION

Samuel Ruben, New Rochelle, N. Y.

No Drawing. Application November 12, 1935,
Serial No. 49,351

5 Claims. (Cl. 75—170)

This invention relates to a metal composition.

An object of the invention is the provision of a metal composition suitable for use as a cathode member.

Another object is the provision of an electrode material having incorporated therein a stable low work function compound which is electrically conductive at room temperature.

A further object is the provision of an alloy composed of a base material such as nickel or nickel and chromium with which has been incorporated a very small amount of a silicide of one or more of the alkaline earth metals strontium, barium or calcium.

In the prior art there are metal compositions of nickel and barium, for instance, in the patent to Boving, 1,636,763, there is disclosed a material formed from adding barium to nickel in powdered form, the mass being sintered and molded into the desired shape. However, the use of barium in the metallic state is undesirable in a great many instances, because of the invariable tendency of the metal to form its oxide. It is well known that barium, when exposed to the atmosphere, will not remain as barium but will form barium oxide, which is an insulator at ordinary temperatures and which requires heating to render it electrically conductive. The use of one or more of the alkaline earth silicides, which require no heating to become conductive and which are remarkably stable, offers important advantages and improvements over the use of the alkaline metals or their oxides.

I have found that a composition composed of nickel and 1% or less of a silicide of barium, strontium or calcium is especially adapted for use in the fabrication of cathodes. A specific use for the material is its fabrication into spark plug electrodes.

Generally, the composition may be said to be formed from 91.5% to 99.95% nickel or nickel chromium and 0.05% to 2.5% alkaline earth silicide. I prefer to use the materials in the following ranges:

(A)

| Nickel | Alkaline earth silicide |
|---|---|
| Percent 97.5 to 99.95 | Percent 0.05 to 2.5 |

(B)

| Nickel | Chromium | Alkaline earth silicide |
|---|---|---|
| Percent 91.5 to 98.95 | Percent 1 to 6 | Percent 0.05 to 2.5 |

With either of the two above compositions, it may be of advantage to employ a fractional per cent of a scavenger material. A suitable compound for this purpose is magnesium silicide, which may be added up to 0.5%.

In the preparation of a typical composition, I use 99% nickel and 1% of an equimolar mixture of strontium and barium silicides, the materials being in finely divided form, and to these I add 0.5% magnesium silicide as a scavenger. The various constituents are pressed into a high density rod which is sintered or welded by discharging a high current density therethrough. The current and temperature required will depend upon the particular proportions used and the pressure of the surrounding atmosphere. In most cases, a temperature of about 1500° C. will suffice.

The sintering and welding of the finely divided materials into a homogeneous mass is preferably accomplished in an inert atmosphere of helium or if the temperature is controlled, hydrogen can be used.

As stated above, the magnesium silicide may be omitted, if desired, as it is used chiefly as a scavenger and to produce a rod of higher density. The latter erect is probably due to partial dissociation of the magnesium silicide and the production of some free magnesium.

The mixture of barium and strontium silicide has been found to be somewhat better than either one alone although for practical purposes the silicide of barium, strontium or calcium may be employed.

The addition of chromium limits oxidation and corrosion and it may be added either in elemental form or as an alloy of nickel.

I have described a method of preparing the composition by mixing the ingredients in finely divided form, pressing and sintering at a high temperature but if desired the nickel or nickel chromium may be heated and the silicide added at the melting point.

Where the composition is drawn to wire form and used in the fabrication of spark plug electrodes, the silicide content is preferably kept below 1% and it has been found that 0.2% is quite ample to secure the desired characteristics. The maximum percentage of alkaline earth silicide combined with the nickel or nickel chromium base is dependent upon the degree of malleability desired in the finished product. The useful range of silicide appears to be from 0.05% to 2.5%.

Cobalt may be used as a substitute in whole or in part for the nickel but because of the wide difference in cost, nickel is preferred.

This invention does not exclude the addition to the composition of other elements which have the effect chiefly of diluting the nickel and the presence of which does not seriously impair the benefits and advantages derived from the use of the alkaline earth silicide. Obvious variations in the composition and the use of equivalents which do not substantially alter the advantages obtained by the present invention are considered to be within the scope of the present application.

Having described by invention, what I claim is:

1. A metal composition composed of nickel, about 97.5% to 99.95% and alkaline earth silicide, about 0.05% to 2.5%.

2. A metal composition composed of about 99% nickel and about 1% alkaline earth silicide.

3. A spark plug electrode composed of nickel, about 97.5% to 99.95% and alkaline earth silicide, about 0.05% to 2.5%.

4. A metal composition composed of 0.05% to 2.5% of an alkaline earth silicide and the remainder substantially all nickel characterized by a low work function and by greater constancy of electrical conductivity with variations in temperature than a similar composition containing alkaline earth oxides in place of said alkaline earth silicides.

5. A spark plug electrode composed of 0.05% to 2.5% of an alkaline earth silicide and the remainder substantially all nickel characterized by a low work function and by greater constancy of electrical conductivity with variations in temperature than a similar composition containing alkaline earth oxides in place of said alkaline earth silicides.

SAMUEL RUBEN.